Nov. 22, 1955     H. P. KALMUS     2,724,269
APPARATUS FOR MEASURING FLOW
Filed Dec. 30, 1952     2 Sheets-Sheet 1

*INVENTOR*
HENRY P. KALMUS

BY     *Howard L. Rose*
AGENT

Nov. 22, 1955  H. P. KALMUS  2,724,269
APPARATUS FOR MEASURING FLOW
Filed Dec. 30, 1952  2 Sheets-Sheet 2

INVENTOR
HENRY P. KALMUS

BY Howard L. Rose
AGENT

United States Patent Office 2,724,269
Patented Nov. 22, 1955

2,724,269

APPARATUS FOR MEASURING FLOW

Henry Paul Kalmus, Washington, D. C., assignor to the United States of America as represented by the Secretary of Commerce Application December 30, 1952, Serial No. 328,543

8 Claims. (Cl. 73—194)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to apparatus for measuring the rate of flow of a medium by means of a sound wave, which is transmitted over a fixed distance between a transmitter and a receiver, and in particular to a system of the type described in which the transmitter and receiver are interchanged periodically without varying their locations.

There are several well known apparatus in the prior art for measuring the rates of flow of fluids, these generally being classified as mechanical and electrical systems. In mechanical systems there are two main drawbacks—(1) the sensing element of the measuring instrument must be introduced into the fluid medium, thereby causing obstructions and discontinuities in the flow, and (2) rapid changes in velocity cannot be detected, owing to the inherent inertia of the mechanical parts. An electrical flow meter based on the principle of the homopolar machine has been used. In this device a magnetic field is applied across the flowing medium in a plane vertical to the direction of flow and the shift of the magnetic field along the line of flow due to the movement of the medium is measured. However, this system has a very low signal-to-noise ratio so that critical adjustments are required if low velocities are to be determined. In addition, the liquid whose velocity is to be measured must be conductive. A system for the measurement of flow of gases has been developed employing the resistance change of hot wires. In this method the hot wire represents an obstruction to the flow. Besides, this system is not generally applicable to liquids because of the physical and chemical effect the hot wire may exert on the liquid. Another apparatus employed in the prior art is that in which a sound wave is transmitted through the medium whose velocity of flow is to be measured and the phase shift between transmitted and received waves is measured. However, in this system, since the velocity of propagation of the sound wave through the fluid is far greater than the velocity of flow, any small change in the distance between the transmitter and receiver or in the concentration or density of the medium, causes a very large change in the phase shift dut to the velocity of propagation, obscuring the comparatively small phase shift due to the velocity of flow.

It is the primary object of this invention to provide apparatus for measuring the velocity of flow of a medium by means of a sound wave in which the effects of the changes in the distance between transmitter and receiver and in the velocity of propagation in the medium are reduced to a very small value.

Another object of the present invention is to provide apparatus for measuring the rate of flow of a fluid medium by means of sound waves in which the effects of changes in the distance between transmitter and receiver and in the velocity of propagation of the fluid are minimized by periodically interchanging the sound wave transmitter and receiver.

Another object of the present invention is to provide apparatus for measuring the rate of flow of a fluid medium by means of sound waves in which the effects of changes in the phase characteristics of the equipment are rendered harmless by periodically interchanging the transmitter and receiver.

Another object of this invention is to provide apparatus for measuring the rate of flow of a medium without introducing mechanical obstructions into the path of flow of the medium.

Another object of the invention is to provide an apparatus for determining the rate of flow in a medium in which the signal-to-noise ratio of the received signal is very high.

Another object of this invention is to provide an apparatus for determining the rate of flow of a medium by which rapid changes in velocity can be easily detected.

Another object of the invention is to provide apparatus for measuring rate of flow in a medium in which the signal-to-noise ratio of the received signal is sufficiently high to permit the measurement of flow velocities.

Another object of the invention is to provide apparatus for measuring the rate of flow of a medium which is applicable to measuring the rate of flow of gases as well as of liquids.

Another object of the present invention is to provide a mechanical switch for periodically interchanging the transmitter and receiver which is compatible with the overall system.

Another object of the invention is to provide a mechanical switch for periodically interchanging the transmitter and receiver which has very low capacitive coupling between the switch contacts.

Other uses and advantages of the invention will become apparent upon reference to the specification and drawings.

Figure 2:
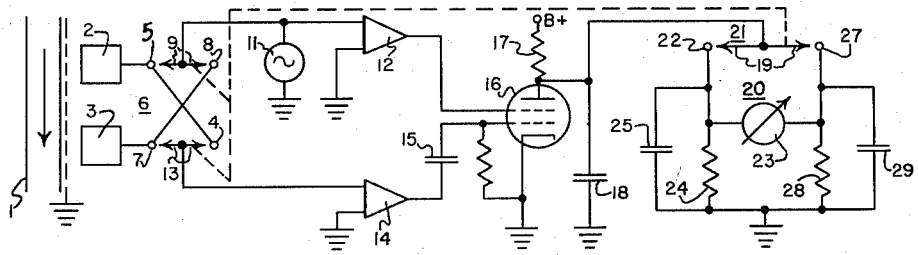
Figure 2 is a diagram showing one embodiment of the invention.

Attempts were made in the prior art to measure the velocity of flow of a medium by transmitting a sound wave through the medium over a fixed distance and measuring the phase shift between the transmitted and received signals. Such a system has been described in AIEE miscellaneous paper 50–214, August 1950, entitled, "An Ultrasonic Method for Measuring Water Velocity" by Hess, Swengel, and Waldorf. These systems were found to be impracticable where flow measurements are critical, however, since small changes in the distance between the transmitter and receiver or small changes in the propagation velocity of the medium produced phase shift errors which were many times larger than the phase shift to be measured. This difficulty can be shown graphically by reference to Figure 1, which is a plot of the voltage pulses along a time base. Assume that initially the fluid is not flowing, and that the transmitter of the sound wave sends out a pulse at the time $t_T$. This pulse will be picked up by the receiver at a time $t_R$, the time delay between $t_T$ and $t_R$ depending upon the velocity of propagation of the liquid and the distance between the transmitter and receiver. If the fluid is now caused to flow and another pulse is sent out by the transmitter at time $t_T$, and the receiver is placed downstream from the transmitter, the receiver will receive the pulse at a time $t_D$. The elapsed time between $t_T$ and $t_D$ is less than the time between $t_T$ and $t_R$ because the velocity of flow is added to the velocity of propagation; that is, the sound wave is carried along at an increased rate owing to the flow of the fluid. The phase difference between the transmitted and received pulses due to the velocity of flow is the difference in time between $t_R$ and $t_D$ which, as can be seen from the drawing, is very small as compared with the time difference between $t_T$ and $t_R$. Therefore, even a small change in the velocity of propagation of the fluid or in the distance between the transmitter and receiver will produce a phase change that is large compared to the phase change produced by the velocity of flow and will completely conceal the effect of the velocity of flow. This is clearly demonstrated by the following mathematical analysis.

Let the voltage applied to the transmitter be $$E_1 = A \sin \omega t_T \qquad (1)$$

The received wave is delayed by the transit time of the sound wave through the medium. This time delay is $$t_D - t_T = \frac{D}{c+v} \qquad (2)$$

where D is the distance between transmitter and receiver, $c$ is the propagation velocity of the medium, and $v$ is the velocity of flow, which is assumed to be in the direction of transmitter to receiver. Therefore, the velocities $c$ and $v$ are additive in this situation. The voltage received by the transmitter is represented by $$E_2 = KA \sin \omega \left( t_T - \frac{D}{c+v} \right) \qquad (3)$$

The phase angle difference between the transmitted and received waves is $$\Delta \phi_1 = \omega \frac{D}{c+v} \qquad (4)$$

which is approximately equal to $$\Delta \phi_1 \doteq \left( \frac{D}{c} - \frac{vD}{c^2} \right) \qquad (5)$$

where $D/c$ is the component of the phase shift due to the velocity of propagation of the sound wave through the medium, and $vD/c^2$ is the component of the phase shift due to the velocity of flow of the medium. It can be seen from this that a small change in D or $c$ will produce a far greater change in the first term of the equation than will be produced in the second term. This will be graphically demonstrated by assuming that $\omega = 2\pi \times 10^5$ cycles/second
$D = 10$ centimeters
$c = 1.5 \times 10^5$ centimeters/second
$c = 10$ centimeters/second.

The phase shift due to the velocity of flow, $v$, is 0.16 degree, and the phase shift due to the velocity of propagation is equal to 2400 degrees. Therefore, if the distance or the velocity of propagation is varied by only one-tenth of one percent, an error of 2.4 degrees is produced, which is obviously many times larger than the value to be measured, which is 0.16 degree.

An additional error is produced by changes in the phase characteristics of one or the other or both of the crystals and the amplifier. As shown before, the phase shifts to be determined are so small that it becomes necessary to insure long-time phase stability of the system, and this is not usually possible.

The present invention contemplates eliminating the errors due to changes in distance and velocity of propagation by eliminating the first term of Equation 5 (i. e., $D/c$), and therefore any change occurring in D or $c$ will have a comparatively small effect upon the phase shift angle which is to be measured. Actually any changes in D or $c$ will produce an error of only the same or twice the actual percentage change in that value. The first term of Equation 5 can be eliminated by periodically exchanging the transmitter and receiver without varying their locations. This can be done by use of identical piezoelectric or magnetostrictive exciters as transmitter and receiver and by switching their connections alternately into transmitting and receiving channels.

Referring again to Figure 1, suppose the transmitter and receiver have been interchanged and that the direction of propagation of the sound wave is opposite to the direction of flow of the medium, that is, in the upstream direction. In this case the elapsed time between transmission and reception of the wave will be increased over the time in the no-flow condition, since the flow of the fluid carries the sound wave along in a direction opposite to the direction of propagation. As a result the transmitted pulse will be received at a time $t_U$. The shift in time between $t_R$ and $t_U$ will be equal and opposite to the shift between $t_R$ and $t_D$. If means are now provided for measuring the elapsed time between $t_D$ and $t_U$, a time will be measured which is equal to twice the phase shift due to the velocity of flow, and the constant large phase shift due to the velocity of propagation is eliminated.

This can be demonstrated mathematically by the following analysis:

$$\Delta \phi_1 = \omega \frac{D}{c+v} \doteq \omega \frac{D}{c} - \omega \frac{vD}{c^2} \qquad (5)$$

$$\Delta \phi_2 = \omega \frac{D}{c-v} \doteq \omega \frac{D}{c} + \omega \frac{vD}{c^2} \qquad (6)$$

In Equation 6, the term in the denominator becomes $c-v$, since the sound wave is now being transmitted in a direction opposite to the direction of flow because of the interchange of the transmitter and receiver. The difference between the two phase angles is:

$$\Delta \phi_1 - \Delta \phi_2 \doteq 2\omega \frac{vD}{c^2} \qquad (7)$$

and the constant large phase shift due to propagation velocity, $c$, and distance, D, has been eliminated. The only term remaining in the equation is that which is due to the velocity of flow, $v$.

The phase error due to changes in phase characteristics of the crystals or amplifiers is also eliminated in this system because any additional phase shift in one direction caused by these factors will be cancelled out by an equal shift in the same direction when the transmitter and receiver are interchanged. This result can be obtained only where the same crystals and amplifiers are used for the upstream and downstream measurements.

In Figure 2 there is shown a system according to the present invention in which 1 is a conduit through which the medium flows with a velocity, $v$. Two piezoelectric crystals 2 and 3 are pressed against the conduit so that sound is transmitted from the one crystal to the fluid medium and through the fluid medium into the other crystal. In this description it is assumed that the conduit is sound dead; that is, the walls of the conduit will not transmit sound. The output of the crystal 2 is connected to the contacts 4 and 5 of the switch 6. The output of crystal 3 is connected to the contacts 7 and 8 of switch 6. A moving contact 9 is connected to an oscillator 11 and to the input of the limiting amplifier 12. The moving contact 13 of the switch is connected directly to the input of the limiting amplifier 14. The output of the amplifier 12 is connected to the second control grid of the tube 16, and the output of the amplifier 14 is connected to the first control grid of the tube 16 through a capacitor 15. The plate of the tube is connected to B+ through the resistor 17. The output of the tube 16 is connected to the synchronous rectifier 20 which includes the switch 21, the condensers 25 and 29, and resistors 24 and 28. It should be noted at this point that the movable contacts 9 and 13 of the switch 6 and movable contact 19 of switch 21 are constrained to operate synchronously. The contact 22 of switch 21 is connected to one side of the meter 23, which is connected to ground through the parallel combination of resistor 24 and capacitor 25. Similarly the other contact 27 is connected to the other side of the meter 23 and to ground through resistor 28 and capacitor 29.

The operation of this system will be explained with reference being made to Figures 2, 3a, 3b and 4. Initially the movable contact 9 of the switch 6 is connected to the contact 5 and the movable contact 13 is connected to the contact 7. With this arrangement the oscillator 11 feeds a signal to the crystal 2 which transmits a sound wave through the medium in the conduit 1 in downstream direction. This sound wave is picked up by the crystal 3 and is fed to the amplifier 14. The output of the oscillator 11 is also fed to the amplifier 12 regardless of the position of switch 6. The outputs of these two amplifiers are connected to the grids of the tube 16, which is a tube of the type that is either completely conducting or completely nonconducting. This tube can conduct only when a positive pulse appears on both grids.

Figure 3A:
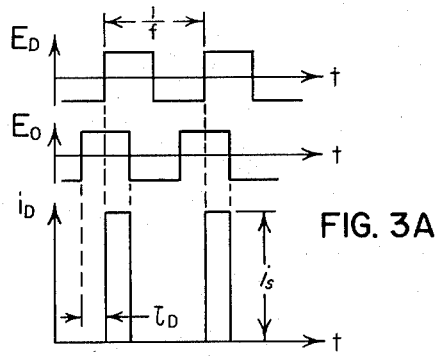
Figure 3 is a plot of the transmitted and received signals showing their phase relationship and also showing the current flowing in the phase detector tube, Figure 3a showing the signals for the downstream transmission and Figure 3b showing the upstream transmission.
Figure 3B:
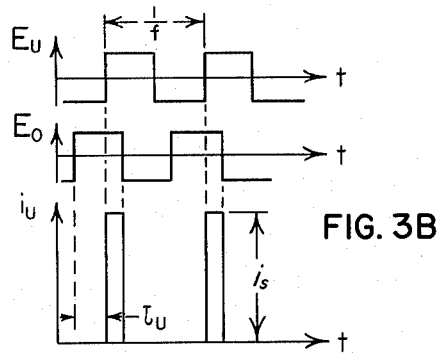

Referring to Figure 3a, the voltage $E_o$ is the voltage output of the oscillator, which after amplification and clipping is applied to the second control grid of the tube 16. The voltage $E_D$, the voltage received at the crystal 3 after amplification and clipping in amplifier 14, is applied to the first grid of the tube 16. Current will flow in the tube only when these two waves appear simultaneously on the grids of the tube. The current $i_D$ will flow in the tube at this time producing the peak $i_s$ as shown in Figure 3a. These peaks, which always have the same amplitude, determined by the tube characteristics, have a width that is determined by the time of overlap of the transmitted and received pulses. After several cycles of transmission from crystal 2 to crystal 3, the switch is reversed so that movable contact 9 now contacts 8 and movable contact 13 contacts 4. The oscillator output is now fed to crystal 3 and transmitted through the medium in the upstream direction to the crystal 2, which picks up the wave and feeds it to the input of the amplifier 14. These voltage waves are then put into the tube 16 and the time of overlap is indicated in Figure 3b. This time of overlap determines the width along the time base of the current $i_u$ in the tube 16. The amplitude of the peaks is again $i_s$. It will be noted that the width of the current peak along the time base in Figure 3a is greater than the width of the current peak in Figure 3b. This can be explained by referring to Equations 5 and 6. In Equation 5, which represents the condition when the velocities of propagation and flow are in the same direction, $\omega(vD/c^2)$ is subtracted from $D/c$ and reduces the phase shift, $\tau_D$, due to that term. In Equation 6, which represents the condition when the velocities of propagation and flow are in different directions $\omega(vD/c^2)$ is added to $D/c$ and adds to the phase shift $\tau_u$ produced by that term. Therefore in the case of Figure 3a, which represents the condition of Equation 5, the phase shift, $\tau_D$, between the transmitted and received pulses will be smaller than the phase shift, $\tau_u$, shown in Figure 3b, which represents the conditions of Equation 6. The time of overlap of the transmitted and received pulses in Figure 3a will therefore be greater than in Figure 3b, and the current pulses will last for a longer time.

Figure 4:
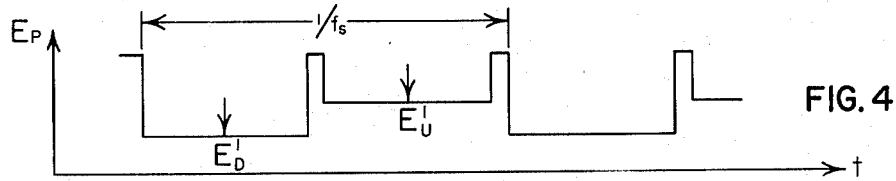
Figure 4 is a plot of the voltage curve at the plate of the phase detector tube.

The voltage developed across the plate load resistor 17 due to the flow of current, as shown by Figure 3a, is integrated by the combination of resistor 17 and capacitor 18, thereby producing a voltage $E_D'$, as shown in Figure 4. The same combination integrates the voltage produced across the resistor 17 by the current flow in Figure 3b. It will be noted in Figure 4 that these two voltages are at different levels and the difference between these two levels indicates the phase difference between the transmitted and received signals as shown by Equation 7. The integration of these signals provides an output which is proportional to the average current flow between two predetermined times. The time over which the average current flow is taken is determined by the rate at which the switch 6 is operated. The average current over that period is determined by the number of pulses applied to the transmitter crystal. That is, if the oscillator 11 puts out a 100 kc. voltage and the switch is operated at 10 cycles/second, there will be about 5000 current pulses of the type shown in Figures 3a and 3b for each switching operation. As shown in Figure 4, the voltage $E_D'$ will appear across capacitor 18 during one half cycle of the switch, and the voltage $E_u'$ will appear across the capacitor during the next half cycle. The time constant of resistor 17-capacitor 18 must be chosen so as to filter out the 100 kc. pulses, while responding to the 10-cycle pulses. The pulse rates mentioned above are exemplary and were used only for the purposes of illustration.

Since the average current flow in Figure 3a is greater than the average current flow in Figure 3b, the average voltage drop across the resistor 17 will be greater for the current of Figure 3a than for the current of Figure 3b. These voltages can be displayed on the screen of a cathode-ray oscilloscope. The plot as shown in Figure 4 will thus be reproduced and the phase angle can be determined by measuring the voltage difference between $E_D'$ and $E_u'$ levels. It can be shown that the voltage difference is equal to $$E_u' - E_D' = 2i_s f \frac{vD}{c^2} R \qquad (8)$$

in which $i_s$ is the peak current flow in the tube which is determinable for any particular tube, $R$ is the value of the plate load resistor, and $f$ is the frequency of the voltage output of the oscillator 11. This equation may be solved for $v$ and the value of the velocity can be readily determined.

If it is desired to read the voltage difference directly across a meter, the synchronous rectifier 20 may be used. The movable contact 19 of the switch 21, which is mechanically constrained to operate in synchronism with the movable contact of the switch 6, is connected to the contact 22 when the voltage $E_D$ is supplied to the tube 16 and is connected to the contact 27 when the voltage $E_u$ is applied to the tube 16. The switch 21 should be designed so that its active period is shorter than the active period of switch 6 so that harmful transients due to the switching function of switch 6 will have been eliminated before a voltage is applied to the synchronous rectifier. Filter circuits composed of resistor 24 and capacitor 25 and resistor 28 and capacitor 29 eliminate the alternating-current component of the voltages and apply a direct-current voltage to the two terminals of the meter 23. Since $E_u'$ is applied to one side of the meter and $E_D'$ is applied to the other side, the meter will indicate the difference between the two voltages.

It has been assumed that the conduit through which the fluid is flowing is sound dead. If this is not the case then a pulsed and gated phase comparison system can be used so that the direct transmission of the sound through the wall of the conduit will be rendered ineffectual. The same result can be accomplished by mounting the crystals in the walls of the conduit, the inner surface of the crystal being flush with the inner surface of the conduit and mounting the crystals in rubber or some other suitable material so as to mechanically insulate the crystals from the conduit.

Also, it should be noted that the system is not limited to measuring flow in a conduit but is equally capable of measuring flow in a room or a chamber or even out-of-doors as long as some of the sound waves leaving the transmitter reach the receiver. Also, this system may be used to measure the relative speed of a body and a fluid either of which, or both of which, are moving, as long as the two transducers are located on the body.

The simple type of switch shown in Figure 2 as switch 6 is not suitable for use with this invention. This can readily be seen when it is realized that a voltage of approximately 100 volts is applied to the crystal 2 while the crystal 3, when used as a receiver, receives a voltage of approximately 200 microvolts. The capacitive coupling from the contact 4 to movable contact 13 is sufficient in an ordinary type of switch to completely obscure the voltage output of the crystal 3. Therefore great caution must be exercised in providing a switch in which the capacitive coupling is very small.

Figure 5:
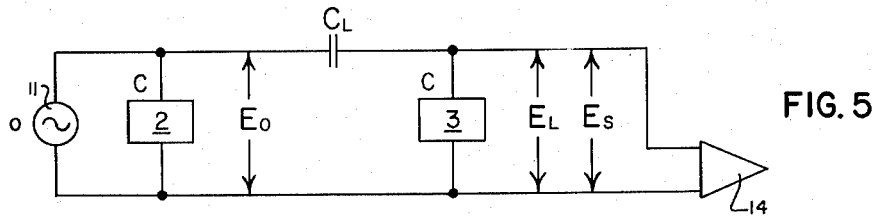
Figure 5 is an equivalent circuit diagram of the switching mechanism.

In Figure 5 the effect of capacitive leakage between the switch contacts is shown. It is assumed that the oscillator 11 has zero impedance and that the amplifier 14 has infinite input impedance. Let the crystal capacities be C and the leakage capacity between the switch contacts be $C_L$. A voltage $E_0$ is impressed on crystal 2 and a desired voltage $E_s$ is produced by crystal 3. The leakage voltage $E_L$ across 3 should be not greater than $E_s/20$ (that is, 10 microvolts) so that phase errors are avoided for very low flow rates.

$$E_D = E_0 \frac{C_L}{C_L + C} \doteq E_0 \frac{C_L}{C}$$

$$C_L = \frac{E_L}{E_0} \cdot C = \frac{E_s}{20 E_0} C$$

for $C = 500\ \mu\mu f$
$E_s = 200\ \mu v$
$E_0 = 100\ v$
$C_L = 5 \cdot 10^{-5}\ \mu\mu f$ The low value of $C_L$, which must be maintained for satisfactory operation, made a very careful design of the commutator necessary in order to eliminate the fringe effects and effects of ground currents.

Figure 6:
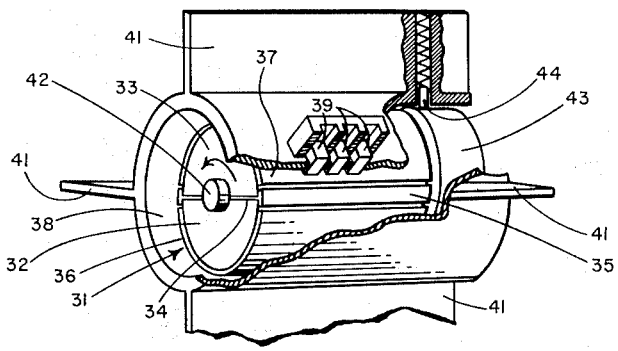
Figure 6 is a perspective drawing, with cut-away portions, of the switching mechanism.

Figure 6 is a perspective view, showing a cut-away portion, of a switch which is suitable for use with the present invention. The rotor 31 is made of two pieces of insulating material 32 and 33 fastened to a grounded conductive shield 34. Two conductive segments 36 and 37 are mounted on the insulating segments without making contact with the shield 34. The shield 34 is brought out to the maximum diameter of the rotor and formed into a shoe 35, thereby shielding the segment 36 from segment 37. The entire rotor is encased in the outer shield 38. The clearance between segments 36 and 37 and the outer shield 38 is made very small so as to limit the stray capacitance between 36 and 37, around 35, to a very small amount. The capacitive leakages in this system are so critical that the leakage between 36 and 37, around 35, could cause large errors unless this tolerance is kept very small. Four sets of carbon brushes, only one of which, 39, is shown, are arranged about the outer diameter of the commutator at 90-degree intervals. The extensions 41 of the outer shield 38 are made so as to contact the box enclosing the commutator, thereby effectively shielding the sectors between the projections 41 from each other. This also helps to prevent stray capacitances between the brushes. The rotor is mounted upon the shaft 42, which shaft is connected to some suitable driving means. On the end of the shaft away from the rotor 31 is mounted a ring 43, which is made to contact the grounding brush 44. This provides for effective grounding for the shield 34, which cannot be effectively grounded through the bearings of the shaft 42. The switch 21 may be mounted on the shaft 42 so as to provide for synchronism between the two switches. The commutators of this switch should be shorter than the commutators or segments 36 and 37 of switch 6 so as to provide a shorter active period for switch 21 for reasons already set out.

Figure 7:
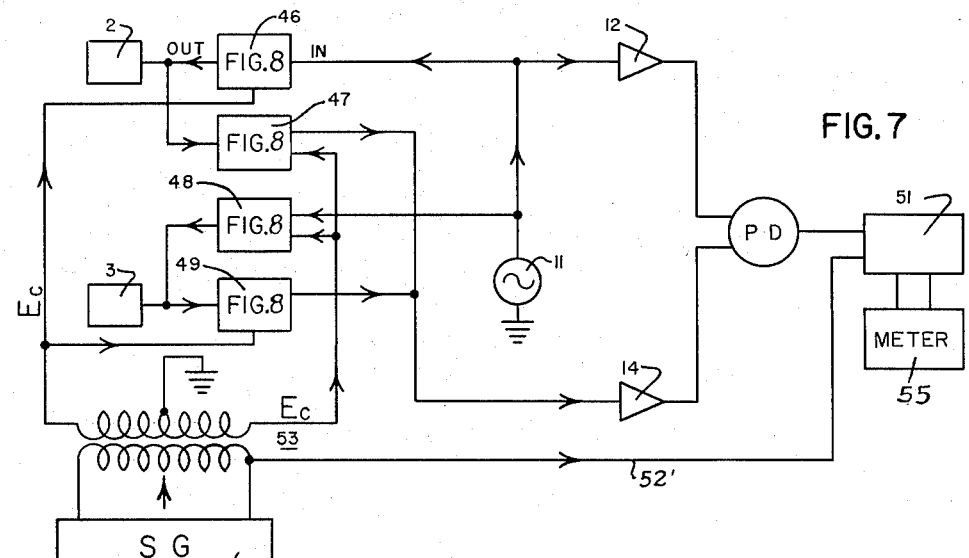
Figure 7 is a circuit diagram of another embodiment of the invention using electronic rather than mechanical switching.
Figure 8:
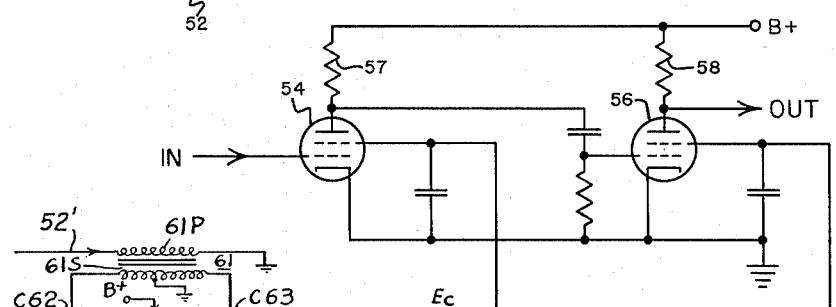
Figure 8 is a circuit diagram of the electronic switching units.

Figure 7 is a diagram of another embodiment of the invention which uses electronic rather than mechanical switching in place of the switch 6 and in the synchronous rectifier 20. In this figure the electronic switches 46, 47, 48, and 49 are used in place of the switch 6. These switches are all identical. The details of one of them are shown in Figure 8. Also, a synchronous rectifier 51 employing electronic switching as shown in Fig. 9 is used in place of the mechanical switching from the phase detector into the meter.

Figure 1:
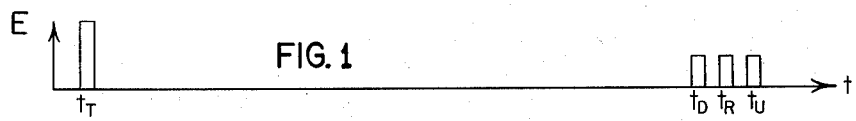
Figure 1 is a voltage-versus-time graph showing the relative effects of the velocity of propagation and velocity of flow.

The operation of this system is the same as the operation of the system shown in Figure 1 in that when the oscillator is connected to crystal 2 through switch 46, the crystal 3 is connected to amplifier 14 through switch 49 and the switches 47 and 48 are open. The switching function is controlled by the square wave generator 52, which through the transformer 53 provides alternate positive and negative pulses to the screen grids of the switching tubes. That is, when a positive pulse appears at the left side of the secondary of the transformer 53, a negative pulse appears on the right side of this secondary. Therefore switches 46 and 49 are on at the same time and switches 47 and 48 are biased to cut-off. Upon a reversal in sign of the output, the right-hand side of the secondary becomes positive and the switches 47 and 48 are closed, switches 46 and 49 being open. A pulse is taken from the primary of the transformer 53 and fed to the synchronous rectifier 51 which connects the output of the tube 16 alternately to one terminal and then the other terminal of the meter 55. In this way the operation of the synchronous rectifier 51 is synchronized with switches 46—49 as will be described. The switches 46—49 must also have very low leakage capacitances. To accomplish this the circuit shown in Figure 8 was employed. During the period when this particular switch is biased to cut-off by the negative pulse being applied to the second control grid of the tubes 54 and 56, the leakage capacitance between the first control grid of tube 54 and the plate is, say, approximately 0.03 micro-microfarads, there being a similar leakage between the grid and plate of the tube 56. If the values of resistors 57 and 58 are made approximately 1600 ohms, the attenuation between the input voltage to tube 54 and output voltage of tube 56 is approximately $10^{-9}$. The tubes 54 and 56 are of the same general type as tube 16 and therefore an output pulse can appear only when both grids are biased positive. The advantage of this type of switching is that much higher switching rates may be used, thereby increasing the rate at which measurements may be made. This is of importance in a system in which the rate of flow varies rapidly.

Figure 9:
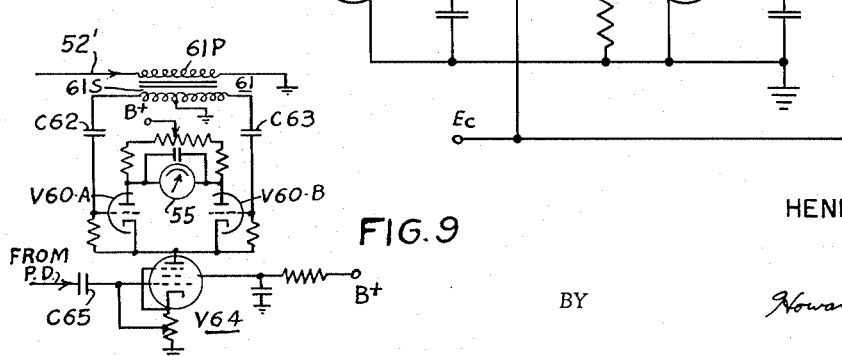
Figure 9 shows a modified version of the synchronous rectifier employing electronic switching.

The synchronous rectifier 51 employed in the modification of Fig. 7 is further detailed in Fig. 9 and employs a conventional electronic switching arrangement together with a gating arrangement articulated to the signal generator 52. As indicated in Fig. 9, the meter 55 shown in Fig. 7 is connected to the output of a pair of triodes, each triode preferably comprising one section of a 12AU7 type tube. The triodes V–60a, V–60b are each arranged to conduct in turn, either one being biased to conduction when the other is cut off. Conduction of the tubes is controlled by a gating arrangement which is keyed to the square wave generator 52 shown in Fig. 7. The output conductor 52' from the square wave generator 52 is applied to the primary winding 61–P of the transformer 61 shown in Fig. 9. The other end of the primary is grounded as shown.

The secondary 61-S of transformer 61 is center tapped to ground to provide a push-pull output which is applied to each grid respectively of the tubes V-60a, V-60b through coupling capacitors C-62, C-63.

The cathodes of the tubes V-60a, V-60b are tied to the plate of a 6ASH5 type pentode V-64 and the output from the phase detector shown in Fig. 7 is applied to the grid of such tube through a coupling condenser C-65 as shown in Fig. 9.

It will be apparent from the described construction that a square wave signal from the generator 52 is applied in synchronism to the secondaries of transformer 53 (Fig. 7) and transformer 61 (Fig. 9) respectively. Because of the push-pull effect provided by the secondary winding 61S, the grids of each of the tubes V-60a, V-60b respectively, will be driven positive alternately as the polarity of the square wave signal changes. In this manner, tubes V-60a, V-60b are alternately rendered conductive for the duration of a square wave of given polarity.

The signal from the phase detector is applied through coupling capacitor C-65 to the control grid of pentode V-64. The purpose of the pentode is largely to compensate for variations in the characteristic of the control tubes V-60a, V-60b. Since the impedance of the pentode V-64 is very large in comparison to that of the triodes V-60a, V-60b, variations in the latter due to tube age, for example, are compensated for by the plate current flow through the high impedance pentode.

The particular gating arrangement or electronic switch comprising the tubes V-60a, V-60b, and V-64 is more fully described in an article by N. A. Schuster entitled, "A Phase-Sensitive Detector Circuit Having High Balance Stability" published in RSI, vol. 22, No. 4, pp. 254-255.

It will be apparent from the above description that the gating signal from the square-wave generator determines the condition of conduction of either of the control tubes V-60a, V-60b. These tubes thereby comprise an electronic switch for gating the signal from the phase detector (PD) and applied through the pentode V-64, to a respective one of the inputs to meter 55. Since such determination is articulated with the action of electronic switches 46—49, the resulting operation corresponds with the action of the mechanical synchronous rectifier 20 previously described in connection with Fig. 2.

It will be apparent that the embodiments shown are only exemplary and that various modifications can be made in construction and arrangement within the scope of my invention as defined in the appended claims.

I claim:

1. Apparatus for measuring the velocity of motion of a medium with respect to loci spaced apart in a direction at least parallel to a component of the flow to be investigated, comprising, first and second transducer means located at each of said loci respectively, a source of oscillatory energy, means for alternately connecting said energy source to said first and second transducer means in timed sequence for producing first and second sound waves therein respectively, first signal recognizing means connected to said energy source and to said connecting means, second signal recognizing means, means articulated to said first connecting means for alternately connecting said second signal recognizing means to said second and first transducer means in like timed sequence, coincidence detecting means connected to the outputs of said first and second signal recognizing means for sequentially producing a first signal which is a function of the time of travel of said first sound wave in said medium between said loci during a first position of said connecting means and for producing a second signal which is a function of the time of travel of said second sound wave in said medium between said loci during a second position of said connecting means and means operatively associated with said detecting means and articulated with said connecting means for indicating a voltage difference between said signals.

2. Apparatus for measuring the velocity of motion of a medium with respect to loci spaced apart in a direction at least parallel to a component of the flow to be investigated comprising, first and second transducer means located at each of said loci respectively, a source of oscillatory energy, means for alternately connecting said energy source to said first and second transducer means in timed sequence for producing first and second sound waves therein respectively, first signal recognizing means connected to said energy source and to said connecting means, second signal recognizing means, means articulated to said first connecting means for alternately connecting said second signal recognizing means to said second and first transducer means in like timed sequence, coincidence detecting means connected to the outputs of said first and second signal recognizing means for producing an alternating-current signal in which the positive excursion is proportional to the time of travel of the first sound wave between the loci, and the negative excursion is proportional to the time of travel of the second of said sound waves between the loci, and means for measuring the difference between said positive and negative excursions.

3. Apparatus for measuring the velocity of motion of a medium with respect to loci spaced apart in a direction at least parallel to a component of the flow to be investigated comprising, first and second transducer means located at each of said loci respectively, a source of oscillatory energy, means for alternately connecting said energy source to said first and second transducer means in timed sequence for producing first and second sound waves therein respectively, first signal recognizing means connected to said energy source and to said connecting means, second signal recognizing means, means articulated to said first connecting means for alternately connecting said second signal recognizing means to said second and first transducer means in like timed sequence, coincidence detecting means connected to the outputs of said first and second signal recognizing means for producing an alternating-current signal in which the positive excursion is proportional to the time of travel of the first sound wave between the loci, and the negative excursion is proportional to the time of travel of the second of said sound waves between the loci, means for producing a first voltage proportional to the negative excursion of the alternating-current signal and a second voltage proportional to the positive excursion of the alternating-current signal and means for measuring the difference between said voltages.

4. The invention as defined in claim 3 in which the means for producing the first and second voltages comprises a synchronous rectifier connected to the output of said coincidence detecting means, said rectifier being articulated to said connecting means for synchronous operation therewith.

5. Apparatus for measuring the velocity of motion of a medium with respect to loci spaced apart in a direction at least parallel to a component of the flow to be investigated, comprising, first and second transducer means located at each of said loci respectively, a source of oscillatory energy, means for alternately connecting said energy source to said first and second transducer means in timed sequence for producing first and second sound waves therein respectively, first signal recognizing means connected to said energy source and to said connecting means, second signal recognizing means, means articulated to said first connecting means for alternately connecting said second signal recognizing means to said second and first transducer means in like timed sequence, coincidence detecting means connected to the outputs of said first and second signal recognizing means for sequentially producing a first signal which is a function of the time of travel of said first sound wave in said medium between said loci during a first position of said connecting means and for producing a second signal which is a function of the time of travel of said second sound wave in said medium between said loci during a second position of said connecting means, the first and second signals being combined in the output of said detecting means to provide an alternating-current signal, and means for measuring the peak-to-peak voltage of the alternating-current signal.

6. An apparatus for determining the rate of flow of a medium relative to two predetermined locations which are spaced apart in a direction at least parallel to a component of the flow to be measured, comprising a first electromechanical transducer adjacent to the path of flow at one of the locations, a second electromechanical transducer adjacent to the path of flow at the other of said locations, a source of periodic voltage pulses, an amplifier, switching means for connecting the first transducer to said source to cause said transducer to produce a first wave in said medium and for connecting the second transducer to said amplifier to energize said amplifier when said transducer is actuated by the sound wave, connections in said switching means for interchanging the connections of said transducers so as to cause a second sound wave to travel from the second transducer to the first transducer, means, including said switching means, for periodically interchanging the connections of said transducers at a rate which is slow compared with the frequency of the periodic voltage pulses, means connected to the outputs of said source and said amplifier to produce an alternating-current voltage in which the magnitude of the negative excursion of the voltage is related to the time of travel of the first sound wave and in which the magnitude of the positive excursion is related to the time of travel of the second sound wave, and means for measuring the voltage difference between the negative and positive excursions.

7. An apparatus for determining the rate of flow of a medium relative to two predetermined locations which are spaced apart in a direction at least parallel to a component of the flow to be measured, comprising a first electromechanical transducer adjacent to the path of flow at one of the locations, a second electromechanical transducer adjacent to the path of flow at the other of said locations, a source of periodic voltage pulses, an amplifier, switching means for connecting the first transducer to said source to cause said transducer to produce a first wave in said medium and for connecting the second transducer to said amplifier to energize said amplifier when said transducer is actuated by the sound wave, connections in said switching means for interchanging the connections of said transducers so as to cause a second sound wave to travel from the second transducer to the first transducer, means for producing a series of current pulses having one parameter related to the time of travel of the sound waves between said locations, said pulses occurring at the frequency of said source, means responsive to said producing means for integrating said current pulses to produce a voltage which is related to the variable parameter of said pulses thereby producing an alternating-current voltage, and means connected to the output of said integrating means for measuring the peak-to-peak voltage of said alternating-current voltage.

8. The invention according to claim 7 in which said means for measuring is a synchronous rectifier connected to receive the output of said integrating means and synchronized with the means for periodically interchanging said transducers.

References Cited in the file of this patent

UNITED STATES PATENTS

| 2,274,262 | Wolff | Feb. 24, 1942 |
| 2,449,078 | Lindenblad | Sept. 14, 1948 |
| 2,534,712 | Gray | Dec. 19, 1950 |
| 2,562,572 | Perlini | July 31, 1951 |

FOREIGN PATENTS

| 623,022 | Great Britain | May 11, 1949 |

OTHER REFERENCES

An Ultrasonic Method for Measuring Water Velocity by Hess, Swengel, and Waldorf, American Institute of Electrical Engineers Miscellaneous Paper 50–214, November 1950.